United States Patent [19]

Nielsen

[11] Patent Number: 5,231,788
[45] Date of Patent: Aug. 3, 1993

[54] BUOYANCY BODY, PRIMARILY FOR USE ON LARGE SEA DEPTHS, AND A METHOD OF MANUFACTURING SUCH A BODY

[76] Inventor: Ove H. Nielsen, Mejsevaenget 4, DK-5700 Svendborg, Denmark

[21] Appl. No.: 743,337
[22] PCT Filed: Feb. 27, 1990
[86] PCT No.: PCT/DK90/00056
 § 371 Date: Aug. 27, 1991
 § 102(e) Date: Aug. 27, 1991
[87] PCT Pub. No.: WO90/09734
 PCT Pub. Date: Sep. 7, 1990

[30] Foreign Application Priority Data
Feb. 27, 1989 [DK] Denmark ............................ 0910/89

[51] Int. Cl.⁵ .................................................. A01K 93/00
[52] U.S. Cl. ............................................. 43/44.9; 43/9.1
[58] Field of Search ................................. 43/9.1, 44.9

[56] References Cited

U.S. PATENT DOCUMENTS

| | | | |
|---|---|---|---|
| 2,166,463 | 7/1939 | Cressey | 43/44.9 |
| 2,566,612 | 9/1951 | Hearne | 43/42.35 |
| 3,392,475 | 7/1968 | Vakousky | 43/44.9 |
| 3,545,120 | 12/1970 | Takaoka | 43/44.9 |
| 3,579,893 | 5/1971 | Wolfe | 43/17.5 |

FOREIGN PATENT DOCUMENTS

| | | | |
|---|---|---|---|
| 1138137 | 6/1957 | Italy | 43/44.9 |
| 793075 | 4/1958 | United Kingdom | 43/44.9 |
| 9009734 | 9/1990 | World Int. Prop. O. | 43/9.1 |
| 9015531 | 12/1990 | World Int. Prop. O. | 43/9.1 |

*Primary Examiner*—Kurt C. Rowan
*Attorney, Agent, or Firm*—Antonelli, Terry, Stout & Kraus

[57] ABSTRACT

A buoyancy body including an assembly of smaller parts formed in such a manner that the smaller parts have no large thickness. The parts are individually produced as foam plastic parts in order to achieve a desired small cell structure. The assembled buoyancy body provides a solid form plastic ball from only two parts, without these parts, at any place, having a material thickness that is more than just a fraction of the ball diameter.

5 Claims, 1 Drawing Sheet

BUOYANCY BODY, PRIMARILY FOR USE ON LARGE SEA DEPTHS, AND A METHOD OF MANUFACTURING SUCH A BODY

FIELD OF THE INVENTION

The present invention relates to a buoyancy body for use at large sea depths, primarily for lifting the upper edge of trawl bags in connection with deep sea fishing.

BACKGROUND OF THE INVENTION

It is here particularly relevant to consider the shrimp fishing in the arctic, where the operation depth is 500–1,000 meters or more. The applied trawl bags should be held open with the use of weight bodies at the lower side of the bag mouth and buoyancy bodies at the top side of the mouth; however, due to the large working depth, there are special demands on the buoyancy bodies because they are subjected to an excessive outer pressure.

Conventionally, these bodies are made as air-filled ball shells of plastic, but it is proved difficult to produce reliable buoyancy bodies of this type because, from resisting the high pressure, the ball shells must be so thick that reasonably small buoyancy balls will exhibit only a limited buoyancy while, with the use of large buoyancy balls, a considerable resistance against the trawl being drawn through the water is created.

Moreover, the buoyancy balls are normally required to have a central through-passage for a rope, and, while the ball shell shape is well suited to resist high outer pressures, it is so very difficult to produce the ball shells inexpensively, which are nevertheless effective and durable with buoyancy balls having such a passage. Buoyancy balls may well initially resist a high pressure, but they become weakened by the considerable pressure variations to which they are exposed by the repeated lowerings and raisings to and from the large depths.

SUMMARY OF THE INVENTION

The present invention is based on the consideration that the basic conditions for achieving a stable buoyancy body that can resist large pressure variations are much better fulfilled by a body produced of a foamed plastic material having closed cells, and, in fact, it is already known to produce small buoyancy bodies in such a material.

The foamed plastic material itself is not very costly but it is both expensive and difficult to produce reasonably large bodies, for example, buoyancy balls having a diameter of 20 cm, in foamed plastic material with a sufficiently homogeneous structure to ensure that the bodies can resist high pressures. During production rather large gas bubbles are created in a central area of the bodies, and, body action of gravity, the distribution of such bubbles will be unsymmetrical, whereby the large bubbles may get close to an outer area, thereby resulting in the pressure resistance of the bodies being weakened. Additionally, the process time for the molding or foaming of a thermoplastic material in the mold is rather long because the foam material has a high heat insulating effect such that it is not easily cooled for rapidly solidifying. Large size buoyancy balls or otherwise shaped bodies, therefore, will be quite expensive if produced with a satisfying quality, and it is hereto be remembered that the pressures to be resisted at the depths mentioned above will be some 50–100 bars or more.

The aim underlying the present invention essentially resides in providing a technique by which it is possible to produce bodies of the aforementioned type in the material described above with a high quality and at reasonable costs.

According to the present invention, each of the bodies is manufactured from a plurality of singular elements, with these elements having an overall relatively small material thickness and being shaped so as to be joinable into an at least substantially compact large size body. Hereby the singular elements will be easy to manufacture with a well controlled quality, and, when the bodies are joined to form the complete final body, the final body has a conventional unbroken shape such as, for example, a ball. The expression "at least substantially compact" is to be understood that it is not really desirable that the entire body be effectively compact, that is, with a complete mutual surface connection between the joined singular elements, since, for the stability of the body, it can be directly advantageous that the water at very high pressure may intrude into partial areas of the body and thus expose the pressure towards each singular element.

The material, as such, of course, should be able to resist the high pressure without collapsing, but, if a low pressure is maintained inside the body, the outer pressure changes will give rise to very large shear tensions along the joined surfaces, whereby the singular elements may easily be separated from each other, unless a very expensive joining technique is used.

Rather than employing an expensive joining technique, in accordance with the present invention, it is possible to employ a very simple joining technique, for example, for a few point joinings, and still achieve a good stability of the buoyancy body.

The buoyancy bodies of the present invention may be assembled from singular parts in many different ways, but it is a practical measure that also quite large bodies such as ball portions may be assembled from only two parts, with each of the ball portions being manufactured with a relatively small material thickness as exemplified in the accompanying drawing.

BRIEF DESCRIPTION OF THE DRAWINGS

In the following description the invention is explained in more detail with reference to the accompanying drawing, wherein.

DETAILED DESCRIPTION

Figure 1:
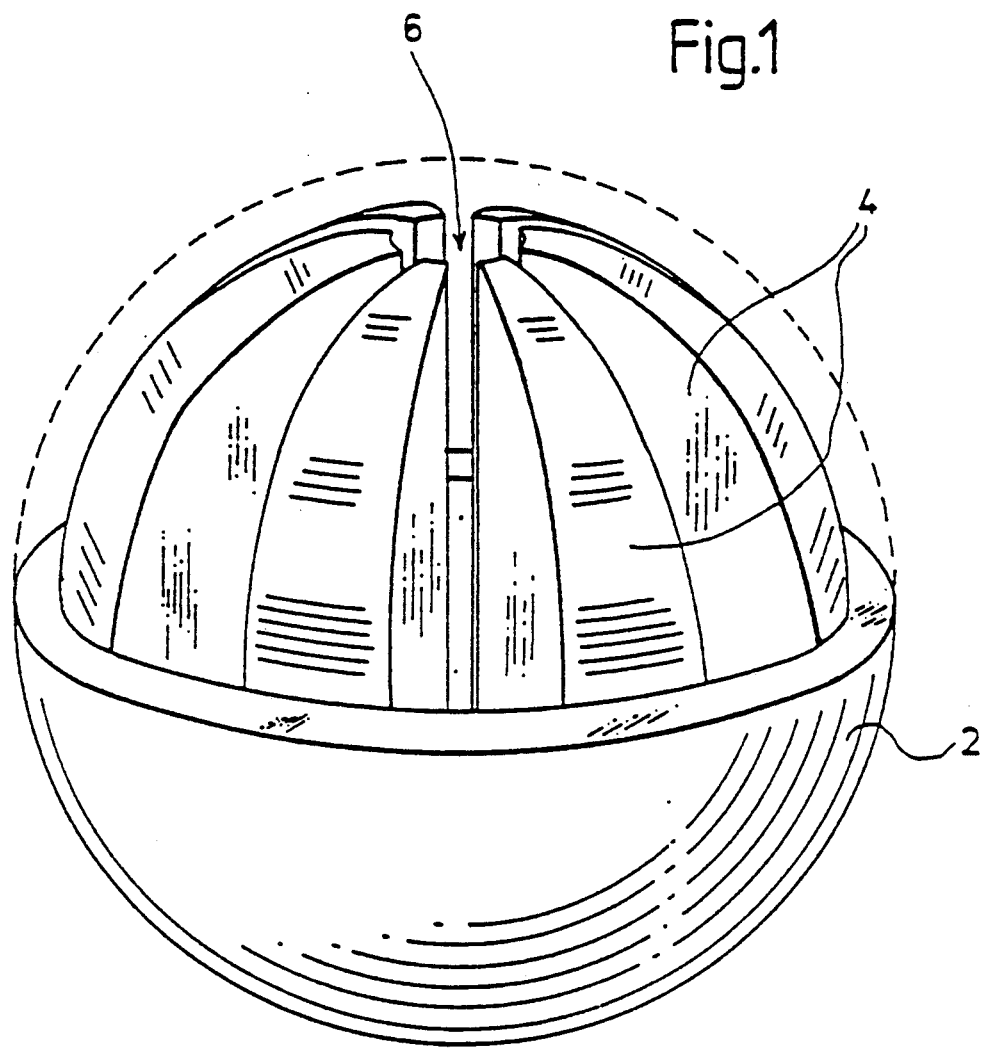
FIG. 1 is a perspective view of one half part of a ball body according to the invention.

In FIG. 1 is shown a half ball element, which has been manufactured in one piece of a foamed plastic material such as polypropylene, with the body including a solid half ball shell 2, from the inside of which ball shell, segments 4 protrude inwardly, with the segments 4 containing upwardly with their outsides curved according to the prolonged ball shall shape of the inside of the half ball shell 2. The segments 4, however, do not extend entirely into the center line, inasfar as the body is shaped with a central passage 6 that breaks out through the central line of the half ball shell 2. The angular extension of the segments 4 is the same as the angular extension of the angular extension of the empty spaces therebetween, and it will be understood therefore, that two identical half ball shells 2 of the illustrated shape can be joined to form a full ball having the passage 6 but otherwise being solid.

The two half ball shells 2 may be held together by, for example, some mirror welded joining areas between the edges of the half ball shells 2 or by glue, preferably, hot melt, placed just spotwise at the outsides of the segments 4 and, on their lateral sides, a suitably fixed joining being possible without any extensive welding or gluing.

As mentioned above, a direct aim is that water is permitted to intrude into the assembled ball body, for example, at places along a plane of separation between the half ball shells 2 and along the planes of separation between the joined elements inside the passage 6. It may, however, be desirable to mount a lining tube in the passage 6, with the lining tube being shaped with trumpet mouth ends, whereby such tube may, of course, hold the half ball shells 2 together. The segments 4 are illustrated with a maximum material thickness which is somewhat larger than the thickness of the half ball shell 2, but it will be understood that this thickness may be reduced by the use of an enlarge number of segments 4. However, it is achieved anyway that a large ball can be formed as a solid body by a joining of only two parts, which are monolithic and each having a relatively small material thickness.

It can be advantageous that the two half ball shells 2 are identical in shape, whereby the half ball shells 2 can be produced in just a single mold; however, it is not a basic condition that the two half ball shells 2 have to be entirely uniform, when the half ball shells 2 only are joinable in a reasonably solid unit.

Figure 3:
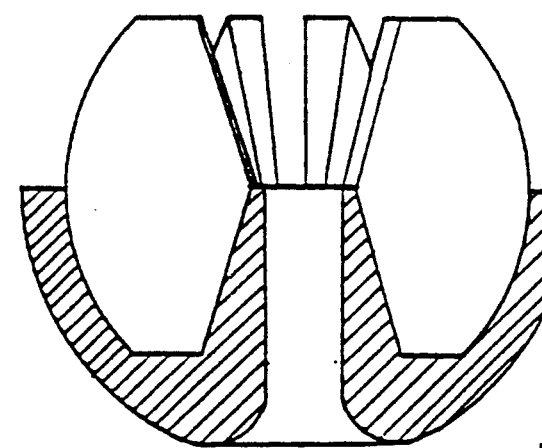
FIGS. 2 and 3 are planar sectional views of modified embodiments of the ball body of FIG. 1.
Figure 2:
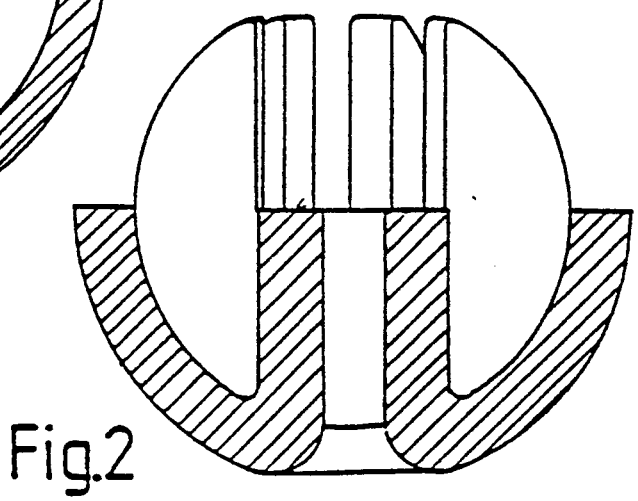

FIG. 2 shows a modified embodiment in which the half ball shell is shaped with a tubular portion about the passage 6, and FIG. 3 shows a corresponding embodiment, in which the tube portion is shaped with a conical outer wall for better slip in the mould.

If it is found acceptable to produce an increased number of single parts with different shapes, it will be a possibility to produce and assemble a number of half ball shells 2 to form whole ball shells successively placed on the outside of the already formed ball, whereby it is possible to build up solid balls of different sizes with the use of parts that have all been produced with a relatively small material thickness. Also, the body may be assembled from parallel disc portions.

I claim:

1. A buoyancy body fashioned of foamed plastic, the buoyancy body comprising a block body assembled from two substantially uniform half parts, each of said half parts comprising one half of an outer shell portion of the body and a plurality of rib portions, each of said rib portions projecting rigidly or transversely inwardly from the outer shell portion as well as axially outwardly therefrom, said rib portions being shaped in such a manner that, when the half parts are pushed together, the rib portions will substantially fill out empty spaces between the rib portions of the respective other half part.

2. A buoyancy body according to claim 1, wherein a passage extends through the buoyancy body and is arranged in a direction of pushing together of the two half parts, and wherein a wall of the passage includes inner edge surfaces of radially arranged ribs or tubular portions interconnecting the inner edge surfaces.

3. A buoyancy body according to claim 2, wherein the two half parts are held together substantially solely by a lining tube inserted in said passage, and wherein the lining tube is expanded at opposite ends thereof.

4. A buoyancy body fashioned of foamed plastic, the buoyancy body comprising at least two singular body parts for forming a substantially compact structure, each of said singular body parts including a plurality of individual segments which, overall, are of a volume substantially less than a volume of the buoyancy body and wherein the singular body parts are joined in a manner such that separation faces between the singular body parts are in non-sealed connection with outer surface portions of an assembled buoyancy body.

5. A method of manufacturing a buoyancy body fashioned of foamed plastic, the buoyancy body comprising at least two singular body parts for forming a substantially compact structure, each of said singular body parts including a plurality of individual segments which, overall, are of a volume substantially less than a volume of the buoyancy body, the method comprising the steps of foaming the singular body parts, setting and cooling the singular body parts, and joining the singular body parts to form the buoyancy body with a substantially compact structure, wherein the step of joining includes anchoring the assembled singular body parts together in such a manner that separation faces between the singular body parts are in a non-sealed connection with outer surface portions of an assembled buoyancy body.

* * * * *